C. J. SMITH.
INTEREST CALCULATING MACHINE.
APPLICATION FILED FEB. 8, 1913. RENEWED APR. 29, 1916.
1,186,140.
Patented June 6, 1916.
4 SHEETS—SHEET 1.
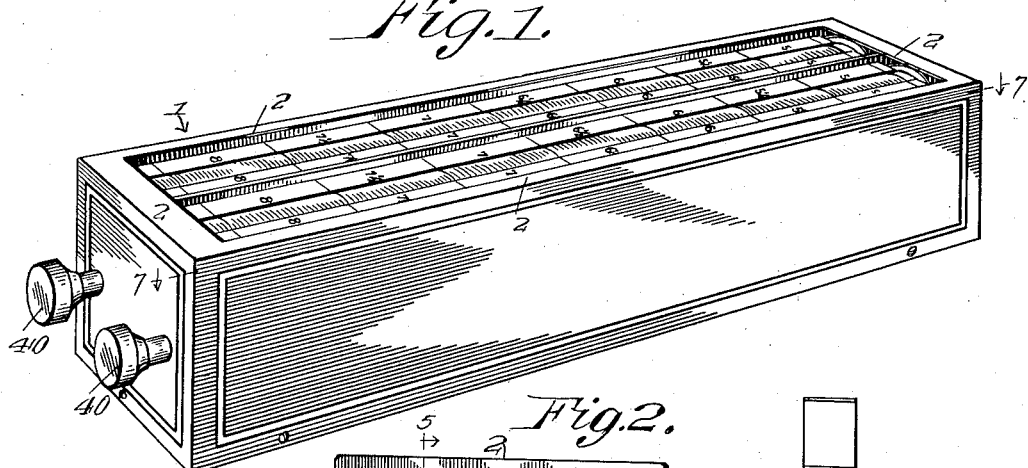
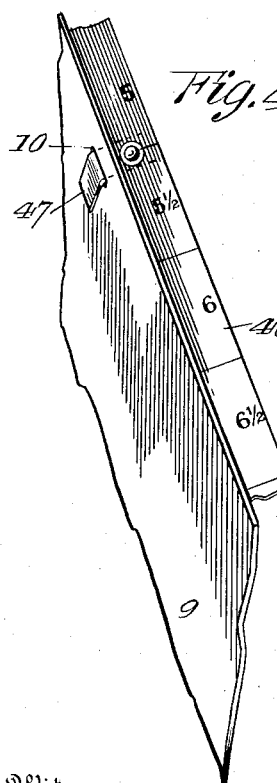
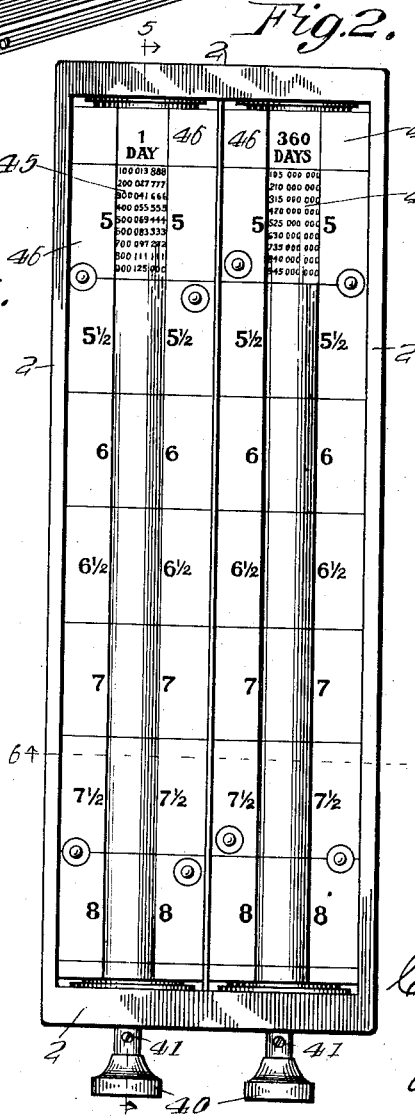
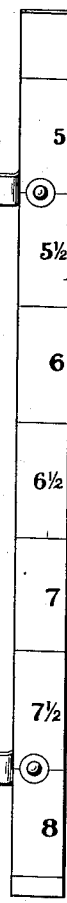
Witnesses
M. A. Bond.
G. M. Copenhaver.
Inventor
Chas. J. Smith
E. K. Bond
Attorney C. J. SMITH.
INTEREST CALCULATING MACHINE.
APPLICATION FILED FEB. 8, 1913. RENEWED APR. 29, 1916.
1,186,140.
Patented June 6, 1916.
4 SHEETS—SHEET 2.
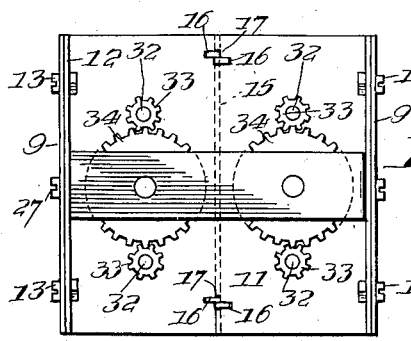
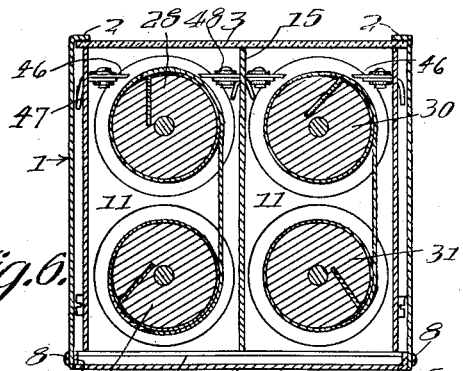
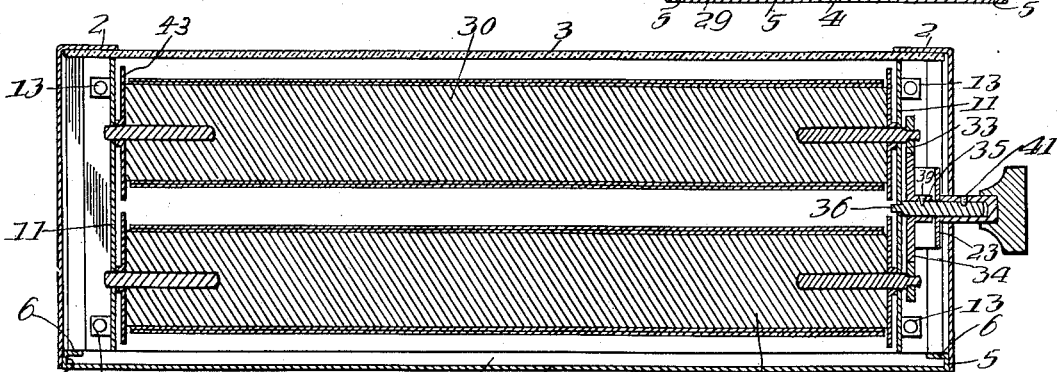
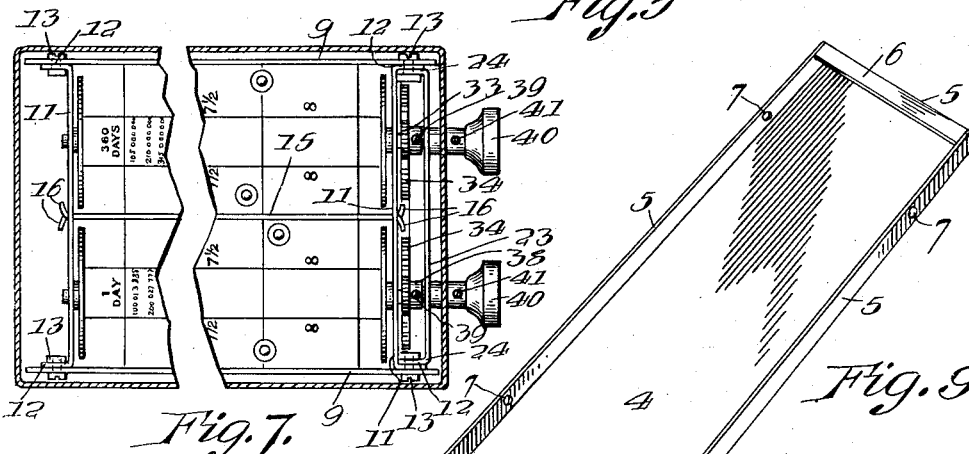
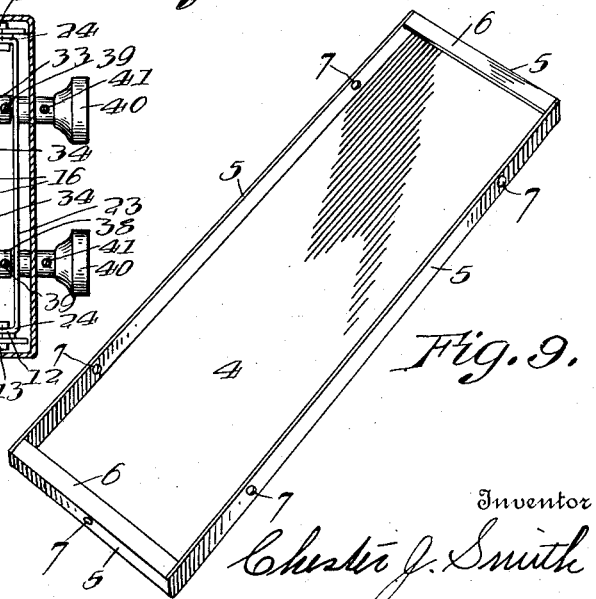
Witnesses
M. A. Bond.
G. M. Copenhaver
Inventor
Chester J. Smith
By E. A. Bond
Attorney

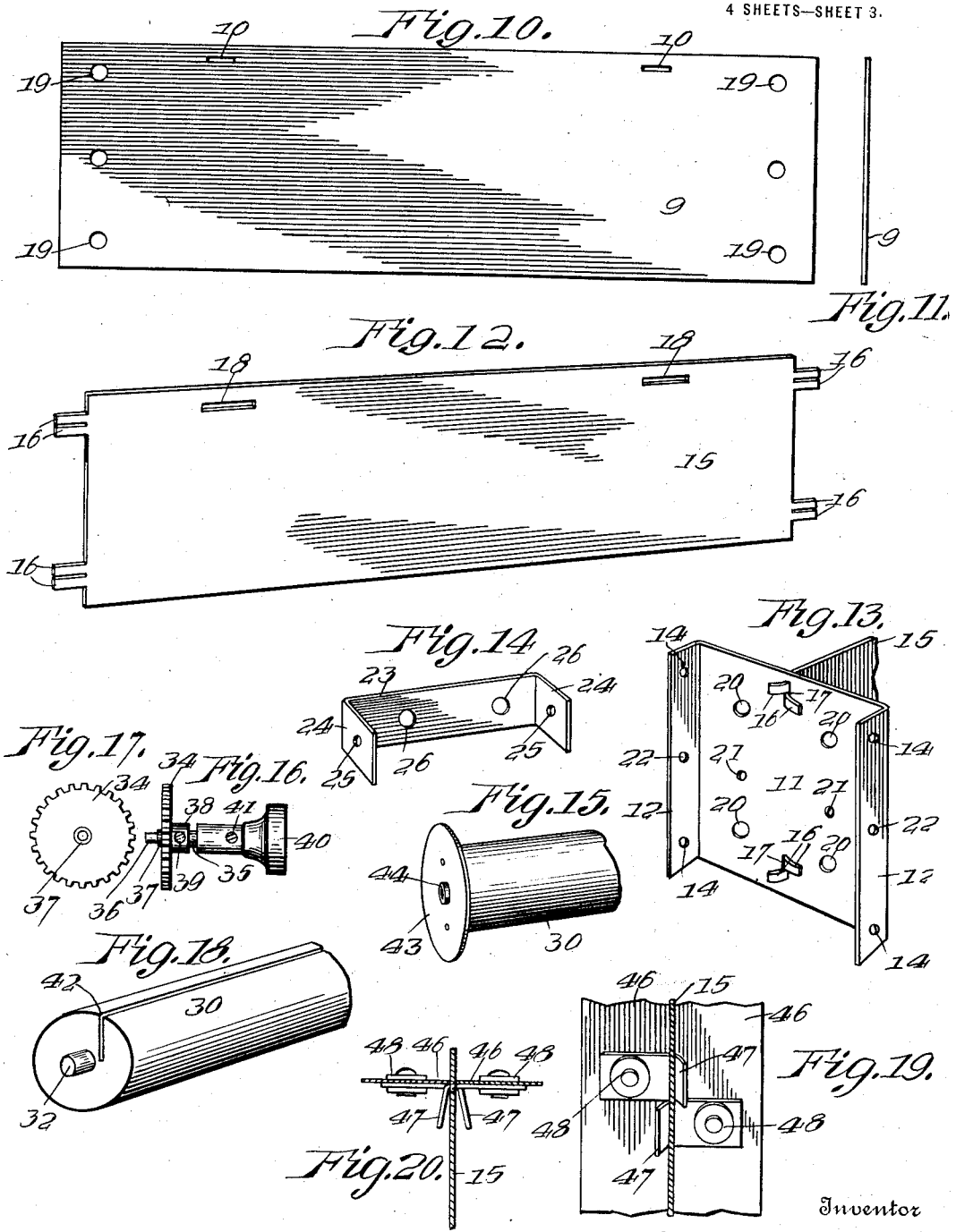

C. J. SMITH.
INTEREST CALCULATING MACHINE.
APPLICATION FILED FEB. 8, 1913. RENEWED APR. 29, 1916.

1,186,140.

Patented June 6, 1916.

4 SHEETS—SHEET 4.

|  | 1 DAY | 2 DAYS | 3 DAYS | 4 DAYS |
|---|---|---|---|---|
| 1⅞ | 100 005 208<br>200 010 416<br>300 015 625<br>400 020 833<br>500 026 041<br>600 031 250<br>700 036 458<br>800 041 666<br>900 046 875 | 100 010 416<br>200 020 833<br>300 031 250<br>400 041 666<br>500 052 083<br>600 062 500<br>700 072 916<br>800 083 333<br>900 093 750 | 100 015 625<br>200 031 250<br>300 046 875<br>400 062 500<br>500 078 125<br>600 093 750<br>700 109 375<br>800 125 000<br>900 140 625 | 100 020 833<br>200 041 666<br>300 062 500<br>400 083 333<br>500 104 166<br>600 125 000<br>700 145 833<br>800 166 666<br>900 187 500 |
| 2 | 100 005 555<br>200 011 111<br>300 016 666<br>400 022 222<br>500 027 777<br>600 033 333<br>700 038 888<br>800 044 444<br>900 050 000 | 100 011 111<br>200 022 222<br>300 033 333<br>400 044 444<br>500 055 555<br>600 066 666<br>700 077 777<br>800 088 888<br>900 100 000 | 100 016 666<br>200 033 333<br>300 050 000<br>400 066 666<br>500 083 333<br>600 100 000<br>700 116 666<br>800 133 333<br>900 150 000 | 100 022 222<br>200 044 444<br>300 066 666<br>400 088 888<br>500 111 111<br>600 133 333<br>700 155 555<br>800 177 777<br>900 200 000 |
| 2⅛ | 100 005 902<br>200 011 805<br>300 017 708<br>400 023 611<br>500 029 513<br>600 035 416<br>700 041 319<br>800 047 222<br>900 053 125 | 100 011 805<br>200 023 611<br>300 035 416<br>400 047 222<br>500 059 027<br>600 070 833<br>700 082 638<br>800 094 444<br>900 106 250 | 100 017 708<br>200 035 416<br>300 053 125<br>400 070 833<br>500 088 541<br>600 106 250<br>700 123 958<br>800 141 666<br>900 159 375 | 100 023 611<br>200 047 222<br>300 070 833<br>400 094 444<br>500 118 055<br>600 141 666<br>700 165 277<br>800 188 888<br>900 212 500 |
| 2¼ | 100 006 250<br>200 012 500<br>300 018 750<br>400 025 000<br>500 031 250<br>600 037 500<br>700 043 750<br>800 050 000<br>900 056 250 | 100 012 500<br>200 025 000<br>300 037 500<br>400 050 000<br>500 062 500<br>600 075 000<br>700 087 500<br>800 100 000<br>900 112 500 | 100 018 750<br>200 037 500<br>300 056 250<br>400 075 000<br>500 093 750<br>600 112 500<br>700 131 250<br>800 150 000<br>900 168 750 | 100 025 000<br>200 050 000<br>300 075 000<br>400 100 000<br>500 125 000<br>600 150 000<br>700 175 000<br>800 200 000<br>900 225 000 |

Fig. 21.

Witnesses
M. A. Bond.
G. M. Copenhaver

Inventor
Chester J. Smith
By E. H. Bond
Attorney

UNITED STATES PATENT OFFICE.

CHESTER J. SMITH, OF JAMESTOWN, NEW YORK.

INTEREST-CALCULATING MACHINE.

1,186,140.  Specification of Letters Patent.  Patented June 6, 1916.

Application filed February 8, 1913, Serial No. 747,102. Renewed April 29, 1916. Serial No. 94,517.

*To all whom it may concern:*

Be it known that I, CHESTER J. SMITH, a citizen of the United States of America, and resident of Jamestown, in the county of Chautauqua and State of New York, have invented certain new and useful Improvements in Interest-Calculating Machines, of which the following is a specification.

This invention relates to certain new and useful improvements in calculating machines and while the present invention is designed primarily for calculation of interest, the main features thereof are not necessarily restricted to mechanism for this specific purpose.

The present invention has for its objects among others to provide a simplified construction, embodying a minimum number of parts and those capable of manufacture and assemblage at small cost so as to reduce the cost of manufacture to the lowest possible figure. I construct the case portion with sides, ends and top of one single integral piece stamped or otherwise shaped to form, and make the bottom removable and with a flange or flanges for supporting the frame carrying the rollers, etc. I so mount the rate cards that while they are practically stationary, they are free for movement to a certain extent in order that they move or "float" to compensate for the increasing diameter of the roller as the sheet is wound thereupon.

I aim further at improvements in the details of construction as well as such other ends as are generally sought in devices of this character.

The essential features of the invention as now to be described, while, in the present instance, shown as embodied in a two-cylinder machine, are equally applicable to a machine in which four or more cylinders are employed, and it is to be understood that the invention, therefore, in the present instance is not to be restricted to a device of the two-cylinder type.

Other objects and advantages of the invention will hereinafter appear and the novel features thereof will be particularly pointed out in the appended claims.

The invention, in its preferred form, is clearly illustrated in the accompanying drawings, which, with the numerals of reference marked thereon, form a part of this specification, and in which—

Figure 1 is a perspective view of my improved device of the two-cylinder type. Fig. 2 is a top plan thereof. Fig. 3 is a view of one of the rate cards removed. Fig. 4 is a perspective detail showing a portion of one of the side plates of the supporting-unit with a rate card attached. Fig. 5 is a vertical longitudinal section, as on the line 5—5 of Fig. 2. Fig. 6 is a vertical transverse section, as on the line 6—6 of Fig. 2. Fig. 7 is a longitudinal section on the line 7—7 of Fig. 1, the figure being broken. Fig. 8 is an end view of the mechanism-unit removed, looking at the gear-end. Fig. 9 is a perspective view of the bottom removed. Fig. 10 is a side elevation of one of the side plates of the mechanism-unit removed. Fig. 11 is an end view thereof. Fig. 12 is an elevation of the partition or division plate removed. Fig. 13 is a perspective detail with a portion broken away showing a flanged end plate, with the end of the partition or division plate attached thereto. Fig. 14 is a perspective view of the support for the roller pintles, removed. Fig. 15 is a detail in perspective showing the end of one of the rollers. Fig. 16 is an elevation of one of the roller-actuating knobs and its gear. Fig. 17 is an end view of Fig. 16. Fig. 18 is a perspective view of one of the rollers, viewed from the end opposite that shown in Fig. 15. Fig. 19 is a bottom plan with the partition or division plate in section, showing the two adjacent rate cards connected therewith. Fig. 20 is a detail in vertical section through the parts seen in Fig. 19. Fig. 21 is an enlarged diagram showing a portion of one of the sheets employed for computing interest.

Like numerals of reference indicate like parts throughout the different views.

The "floating" rate card feature hereinafter described and claimed may be used in connection with inclosing cases and mechanism units of various forms, that now to be described having been found very efficient but given merely as an example without in any way restricting the use of the floating rate card in connection with such particular construction of casing, mechanism unit, etc.

Referring to the drawings, 1 designates the inclosing case which is preferably formed of a single piece of suitable material, such, for instance, as thin sheet metal best adapted for the purpose, stamped or otherwise given the requisite form, in the present instance rectangular, the sides, ends and top of which are integral, the top being practically open, the surrounding flange 2 being adapted to be engaged by the glass or transparent plate 3 which forms the top closure of the device, as will be best understood upon reference to Figs. 5 and 6.

4 is the bottom formed with the surrounding vertical flanges 5 at the sides and ends and at the ends with the horizontal inwardly extending flanges 6, for a purpose which will hereinafter be made clear. The flanges 5 at the sides and ends of the bottom are provided with openings 7 and when the bottom is inserted in position, as seen in Figs. 5 and 6, screws 8 are employed which pass through the side and end walls of the outer casing 1 near the lower edge thereof and through these openings 7 in the flanges of the bottom to secure the parts in position, it being understood that the mechanism-unit now to be described is first inserted within the casing 1 and into its proper position and when the bottom is affixed in position, the glass top 3 is held against the flanges 2 of the casing 1 in a manner which will be readily understood.

I will now describe the mechanism-unit and the manner in which it is constructed. It comprises two side plates, one of which is seen in Fig. 10. It is of proper height and width to fit within the outer casing and each of these side plates is provided near its upper edge with a short longitudinal slot 10, as shown clearly in said Fig. 10, the object of which slots will be soon described. The ends of this unit are seen at 11, each comprising a member having the right-angled flanges 12, 12, to which the ends of the side plates 9 are secured by bolts, screws or the like 13, as seen in Fig. 8, the flanges 12 being provided with suitable openings 14 for the reception of such securing means.

The end plates 11, 11 are connected by the centrally disposed partition or division plate 15, the ends of which are provided with the bendable extensions 16, preferably in pairs, as seen in Fig. 12, which are passed through slots 17 in the end plates and then bent in opposite directions, as seen in Figs. 7, 8 and 13, to firmly join the end plates and hold the partition or division plate in position, yet allowing of ready separation when desired. This partition or division plate 15 is provided near its upper edge with the longitudinal slots 18, one near each end, for a purpose which will soon be made apparent.

The side plates 9 are provided at their ends with openings 19 for the passage of the fastening means 13, which openings are coincident with the openings 14 in the end plates.

The end plates are each provided with openings 20, as seen best in Fig. 13, for the reception of the pintles of the rollers. The front end plate seen in Fig. 13 is further provided with openings 21, for a purpose which will be hereinafter explained. The flanges 12 of this front end plate are also provided with openings 22, as seen in Fig. 13, the purpose of which will be made clear as the description proceeds.

23 is a member having its ends 24 bent at right angles to its body portion and provided with openings 25, as seen best in Fig. 14, the main portion or body of said member being also provided with openings 26, as seen in said figure. This member 23 is secured at the front end of the mechanism-unit, its flanges 24 fitting within the flanges 12 of the front end plate 11 and secured in position by screws or bolts and nuts or the like, as seen at 27 in Fig. 8, the said screws or bolts passing through the openings 22 in the end plate 11 and the openings 25 in the flanges 24.

28 is the upper roller and 29 the lower roller of one pair, while 30 is the upper and 31 the lower roller of the other pair, as seen clearly in Fig. 6. These rollers have their pintles 32 supported in the openings 20 of the end plates, and these pintles at the front end of the machine carry small gears 33, as seen clearly in Figs. 5, 7 and 8. Interposed between and meshing with the gears 33 of each pair of rollers is a large gear 34, seen clearly in Figs. 5 and 8, the arrangement being such that when the large gear is revolved, the upper and lower rollers are revolved in opposite directions. The large gears are each carried by a stub shaft 35 having a reduced end 36 engageable in one of the openings 21 in the front end plate 11 and a shoulder 37 to abut against said end plate. The gear 34 has a hub 38 receiving the stub shaft and this gear is secured to the shaft by a screw 39, it being noted that the hub 38 is disposed between the gear and the inner face of the member 23, as shown best in Figs. 5 and 7.

40 is an operating handle removably engaged with the end of the stub shaft 35, which projects through an opening in the end wall of the casing 1, as seen clearly in Figs. 5 and 7, being secured in position by the screw or analogous means 41.

The rollers are each provided with a longitudinal slit 42, shown in Fig. 18, and also in Fig. 6, into which slits the ends of the sheets are designed to be engaged in a well-known way. The rollers are provided at each end with disks 43 secured thereto in any suitable way and provided axially with a collar or projection 44, seen best in Fig. 15, such end disk being omitted from the roller in Fig. 18. This collar or projection serves to space the end disks from the end plates 11 of the mechanism-unit, as will be clearly understood upon reference to Figs. 5 and 7, and thus prevent the end disks from contact with the end members, thus avoiding friction as well as preventing noise which would be made if these members were allowed to contact.

In Fig. 21 I have shown at 45 a portion of one of the sheets employed. This is given merely by way of example, it being understood, of course, that the figures on the sheet may be continued almost indefinitely and the same arranged for from one day to three hundred and sixty-five days, more or less. In this view, one of the rate cards 46 is illustrated along the edge of the sheet. These rate cards are affixed in position one upon each side of each roller, as seen clearly in Fig. 2. Each card has thereon a figure designating the rate of interest. In the present instance, I have chosen to show the same as arranged for interest at 5, 5½, 6, 6½, 7, 7½, and 8 per cent., but it is evident that other rates of interset may be provided for, the principle being the same. These rate cards are fixed stationary relatively to the rollers, but in order that they may have sufficient freedom of movement so as to "float" or be automatically moved by the increasing diameter of the rollers as the sheet is wound thereon, or to automatically fall back to their former position as the diameter of the roller decreases as the sheet is wound in the opposite direction, I support them as follows: Each rate card has affixed thereto a number, of which I have found two sufficient for each card, of strips 47, as seen in Figs. 3, 4, 19 and 20. These are secured to the under side of the rate cards in any suitable manner, as by clips, clamps or the like 48, as seen in Figs. 2, 3, 4, 19 and 20. These strips 47 have their free ends extending at an angle to the rate cards, as seen best in Figs. 19 and 20, and the said free ends of the strips 47 between the rollers are passed through the slots 18 in the partition or division plate 15, and extended in opposite directions, as seen in Figs. 19 and 20, the free ends of the said strips 47 on the rate cards adjacent the outer sides of the device being passed through the slots 10 of the side plates 9, as seen in Fig. 4. By this means, the rate cards, while held stationary relatively to the rollers, are free to move vertically, either up or down, as the diameter of the rollers increases or decreases, so as to lie closely against the sheets on the rollers which is considered desirable, not only for ease of reading of the figures, but they also in this way tend to keep the sheets from wrinkling.

In practice, the rollers with the sheets affixed thereto are arranged between the end plates and the pintles of the rollers engaged in the openings 20 of such plates; the division plate or partition 15 is placed in position with its lugs 16 extending through the slots 17 of the end plates and these lugs then bent in opposite directions, as seen in Fig. 13. The side plates are then applied, the small gears are affixed to the pintles of the rollers and the side and end plates are secured together by the securing means 13. The larger gears 34 are then placed in position and the member 23 secured between the flanges 12 of the front end plate and the rate cards placed in position. The mechanism-unit is then complete. The casing is, by preference, turned upside down, the glass top 3 being laid upon what will then be the bottom, resting upon the surrounding flange 2 of the casing. The mechanism-unit is then placed in position within the casing. The stub shafts 35 are then passed through the openings in the front end of the casing and through the openings 26 in the member 23 and through the hubs of the large gears, the reduced ends 36 of said stub shafts being engaged in the openings 21 of the front end plate. The large gears are then secured to the stub shafts, after which the operating knobs 40 are placed upon the projecting ends of the stub shafts and secured by the screws 41. The bottom 4 is then applied, the flange of the latter fitting within the side and end walls of the bottom of the casing. The end walls of the mechanism-unit rest upon the inwardly extending flanges 6 at the ends of the bottom, as seen clearly in Fig. 5. The bottom is then secured in position by the screws or analogous means 8 and the device is complete. The upper edges of the side plates and the partition or division plate 15 engage the inner face of the transparent plate 3 and the parts are all held securely in position.

The mode of operation will be apparent and hardly needs detailed description. The rollers are turned so as to bring the figures on the sheet at the top of the device between the rate cards, when the interest for a given amount for a specified time at a certain rate is readily determined.

In Fig. 21 the rate card and the sheet are shown for the calculation of interest at 1¾, 2, 2⅛, 2¼, etc., per cent. It is proposed to have a series of sheets for readily calculating interest at any given per cent. for any length of time for any amount.

The capability of the rate cards to "float" is deemed essential for reasons heretofore given. By the term "float," I mean a condition whereby the rate cards while maintaining a position relatively stationary, are free for movement up or down to compensate for the increasing or decreasing diameter of the rollers.

By "mechanism unit" I mean the unit or that member of the device embodying the end and side plates, and the rollers and their supports, etc., as above described, separable as a whole from the casing and insertible therein as one element complete in itself.

From the foregoing description, it will be seen that I have devised a simple, efficient, reliable interest calculating device capable of manufacture at minimum cost, and while the structural embodiments of the invention as hereinbefore disclosed are what I at the present time consider preferable, it is evident that the same is subject to changes, variations and modifications in details, proportion of parts, etc., without departing from the spirit of the invention or sacrificing any of its advantages. I, therefore, do not intend to restrict myself to the exact details hereinbefore set forth, but reserve the right to make such changes, variations and modifications as come properly within the scope of the protection prayed.

The particular construction of casing and mechanism unit is not herein claimed but forms the subject matter of a separate application.

What is claimed as new is:—

1. In an interest calculating device, a casing, a roller therein and a rate card for cooperation with the roller supported upon some fixed part and capable of freedom of movement automatically as the diameter of the roller increases as the sheet is wound thereupon.

2. In an interest calculating machine, a revoluble roller, a relatively fixed member, a rate card, and means connected to the rate card and movably connected with the fixed member to allow freedom of movement, automatically, of the rate card with relation to the roller.

3. In an interest calculating device, a revoluble roller, a relatively fixed member, a rate card and means connected to the rate card and movably connected with the fixed member to allow freedom of movement, automatically, of the rate card with relation to the roller, said means having angular free ends.

4. In an interest calculating device, a casing, revoluble rollers therein, a partition having a slot and floating rate cards upon opposite sides of said partition and having oppositely disposed members passing through said slot.

Signed by me at Washington, D. C., this 8th day of February, 1913.

CHESTER J. SMITH.

Witnesses:
JOHN SCRIVENER,
E. H. BOND.